3,361,457
TIE ROD SAFETY ATTACHMENT
Joseph R. Aldinger, 264 Woodlawn Ave.,
Jersey City, N.J. 07305
Filed Sept. 28, 1965, Ser. No. 490,990
2 Claims. (Cl. 287—90)

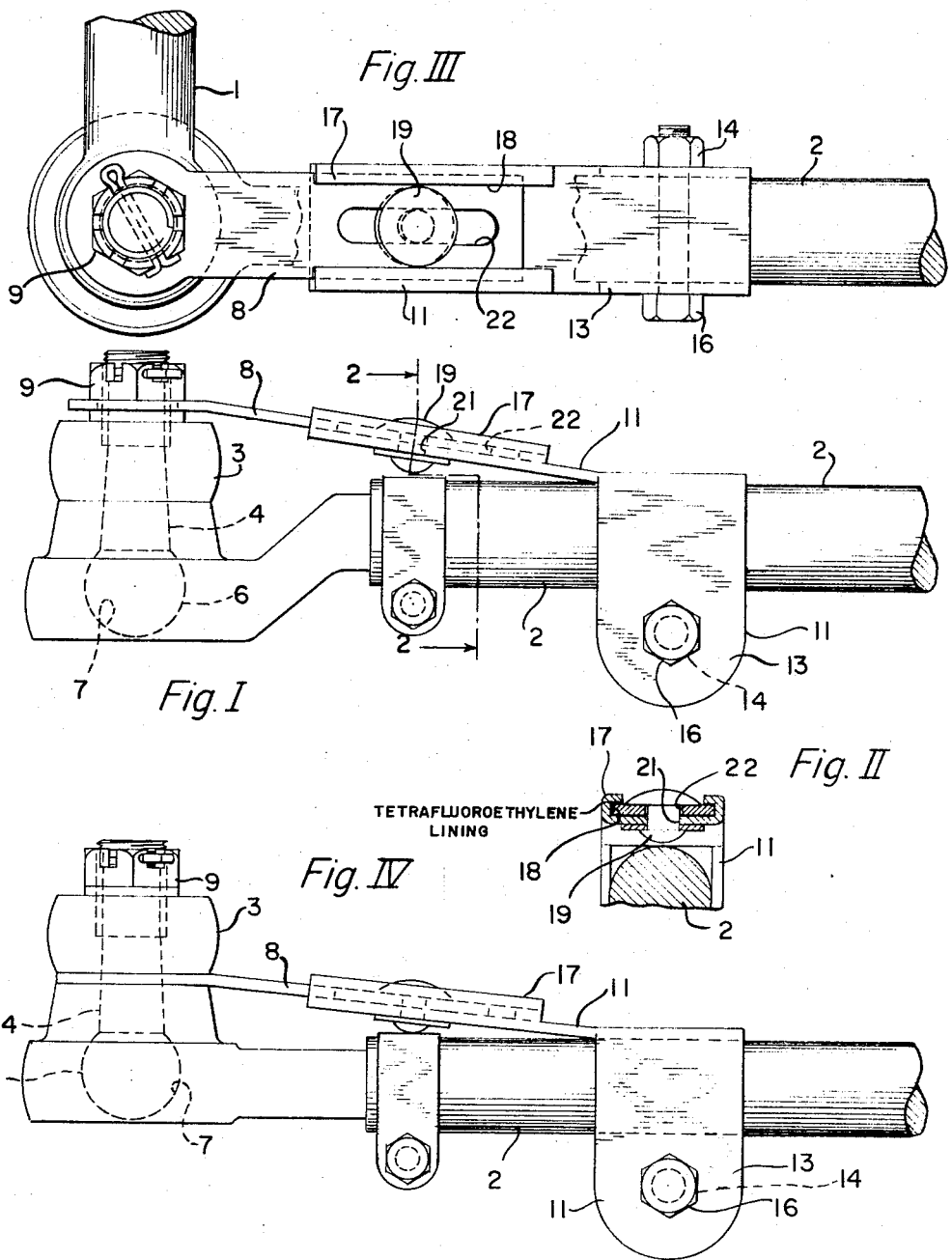

ABSTRACT OF THE DISCLOSURE

This disclosure relates to the connection of tie rod ends to steering knuckle arms of motor vehicles by means of ball and socket joints. The invention is a safety attachment which prevents such a tie rod from falling off should the ball and socket joint become badly worn. More particularly a strap is connected to the steering knuckle and another to the tie rod. The straps extend longitudinally along the tie rod and are slidably connected with each other for movement parallel to their axes.

---

This disclosure relates to steering mechanisms for motor vehicles and more particularly to the connection of tie rod ends to steering knuckle arms by means of ball and socket joints. The invention resides in a safety attachment to prevent such a tie rod from falling off should the ball and socket joint become badly worn. By this device the sudden loss of steering control of the vehicle is prevented.

One objective of this invention is to provide a tie rod safety attachment which may be easily and quickly fitted at the ball and socket joint to hold the tie rod in assembled relationship should the ball and socket joint become badly worn. This device, while retaining the tie rod assembly, also allows the wheels to toe in or out so that they will squeal thereby notifying the driver of the defect.

Another objective is to provide such a safety attachment which is inexpensive to manufacture, is able to withstand abuse, does not interfere with lubrication of the joint and is otherwise well suited to the purposes for which it is intended.

Another objective is to provide such a safety attachment which, while the tie rod assembly is operational, will absorb road vibrations, reduce sway and tire wear, firm up power steering and also reduce wear on the steering system.

Additional objects and advantages will appear in the details of construction and operation which are more fully described in the accompanying drawing wherein:

FIGURE I is a side view of a tie rod and steering knuckle arm with a safety attachment according to this invention.

FIGURE II is a sectional view taken along line II—II of FIGURE I.

FIGURE III is a top view of the safety attachment shown in FIGURE I.

FIGURE IV is a view similar to FIGURE I and shows a second embodiment of the invention.

Referring to the drawings in detail, steering knuckle arm 1 and tie rod end 2 serve as a portion of a conventional steering assembly. Steering knuckle arm 1 is formed with sleeve 3 at one end, through which is vertically extended stem 4 having at its lower end ball 6 which is received into socket 7 provided in tie rod end 2. As used herein the term "steering knuckle assembly" is intended to include stem 4.

In the embodiment depicted in FIGURES I and III, first strap 8 is connected to stem 4 between steering knuckle arm 1 and stem nut 9, but it should be understood that this first strap could also be connected below the steering knuckle arm as shown in FIGURE IV. Second strap 11 is connected to tie rod 2 by means of yoke 13, nut 14 and bolt 16. Lateral edges 17 of second strap 11 are folded toward each other to define channel 18 for receiving first strap 8 in sliding engagement therein. Key members 19 are connected through first holes 21 and pass through elongated keyway 22 for engagement therewith. Keyway 22 is arranged in registry with first holes 21 so that first strap 8 moves substantially in alignment with tie rod 2 to allow the steering assembly to articulate. The sliding surfaces of first strap 8 and second strap 11 may be lined with tetrafluoroethylene for lasting lubrication.

It will be understood by those familiar with this art that wide deviations may be made in the details of the shown embodiment without departing from the main theme of invention set forth in the claims.

What is claimed is:

1. In a steering assembly of a motor vehicle which includes at least one tie rod and at least one steering knuckle, with the steering knuckle forming a sleeve adapted to receive a vertically extending stem, and with the upper end of the stem threaded to receive a stem nut which engages the steering knuckle into operative position, and with a socket provided at the end of the tie rod to accept the ball therein; a safety attachment comprising a first strap with an opening adapted to receive the steering knuckle for connection thereto, an elongated second strap connected to the tie rod and having lateral edges folded toward each other to define a channel substantially parallel with the tie rod for receiving the first strap in sliding engagement therein, one of the straps having a keyway aligned with the tie rod and at least one key connected to the other strap and slidably connected in the keyway so that the safety attachment is able to accommodate articulation of the steering assembly.

2. The combination set forth in claim 1 with at least one of the surfaces in contact between the first and second straps being lined with tetrafluoroethylene.

References Cited

UNITED STATES PATENTS

| | | | |
|---|---|---|---|
| 2,208,325 | 7/1940 | Krutsch | 287—90 |
| 2,510,406 | 6/1950 | Lucas | 287—90 |
| 2,523,321 | 9/1950 | Nelson | 287—90 |

CARL W. TOMLIN, *Primary Examiner.*

EDWARD C. ALLEN, *Examiner.*

A. V. KUNDRAT, *Assistant Examiner.*